United States Patent [19]
Albert

[11] 4,390,965
[45] Jun. 28, 1983

[54] MICRO-WAVE OVENS
[75] Inventor: Lionel Albert, Westmount, Canada
[73] Assignee: Jovanita Inc., Westmount, Canada
[21] Appl. No.: 156,758
[22] Filed: Jun. 5, 1980
[51] Int. Cl.³ .......................... G05B 19/02; H05B 3/02
[52] U.S. Cl. .............................. 364/400; 219/10.55 B;
  219/487; 219/398; 340/309.4; 364/145;
  364/146; 364/477
[58] Field of Search ............... 364/104, 120, 477, 400,
  364/557; 219/394, 398, 486, 487, 492, 501,
  10.55 R, 10.55 B, 10.55 E, 10.55 M; 307/38–41,
  141.4, 141.8; 340/309.4

[56] References Cited
U.S. PATENT DOCUMENTS 3,819,906  6/1974  Gould, Jr. ........................ 364/104 X
3,982,097  9/1976  Seider et al. ......................... 219/486
4,158,759  6/1979  Mason .......................... 219/10.55 B
4,250,370  2/1981  Sasaki et al. .................. 219/10.55 B Primary Examiner—Joseph F. Ruggiero
Attorney, Agent, or Firm—Fishman and Van Kirk

[57] ABSTRACT

The invention relates to a process for preparing a plurality of portions of food in a like plurality of microwave ovens, and to an electronic system in which the process is carried out. The system includes a memory for accepting and storing the time values representing the processing time of respective portions in respective ovens, a clock, and a processor for calculating and selecting the longest of the time values. The processor also counts down the time remaining in the longest time value as clocked off by the clock, and compares, at predetermined intervals, each time value, one at a time, with the time remaining. A respective one of the ovens is turned on when its time value is equal to the time remaining. The processor will also turn off all ovens when the time remaining has reached zero.

14 Claims, 11 Drawing Figures

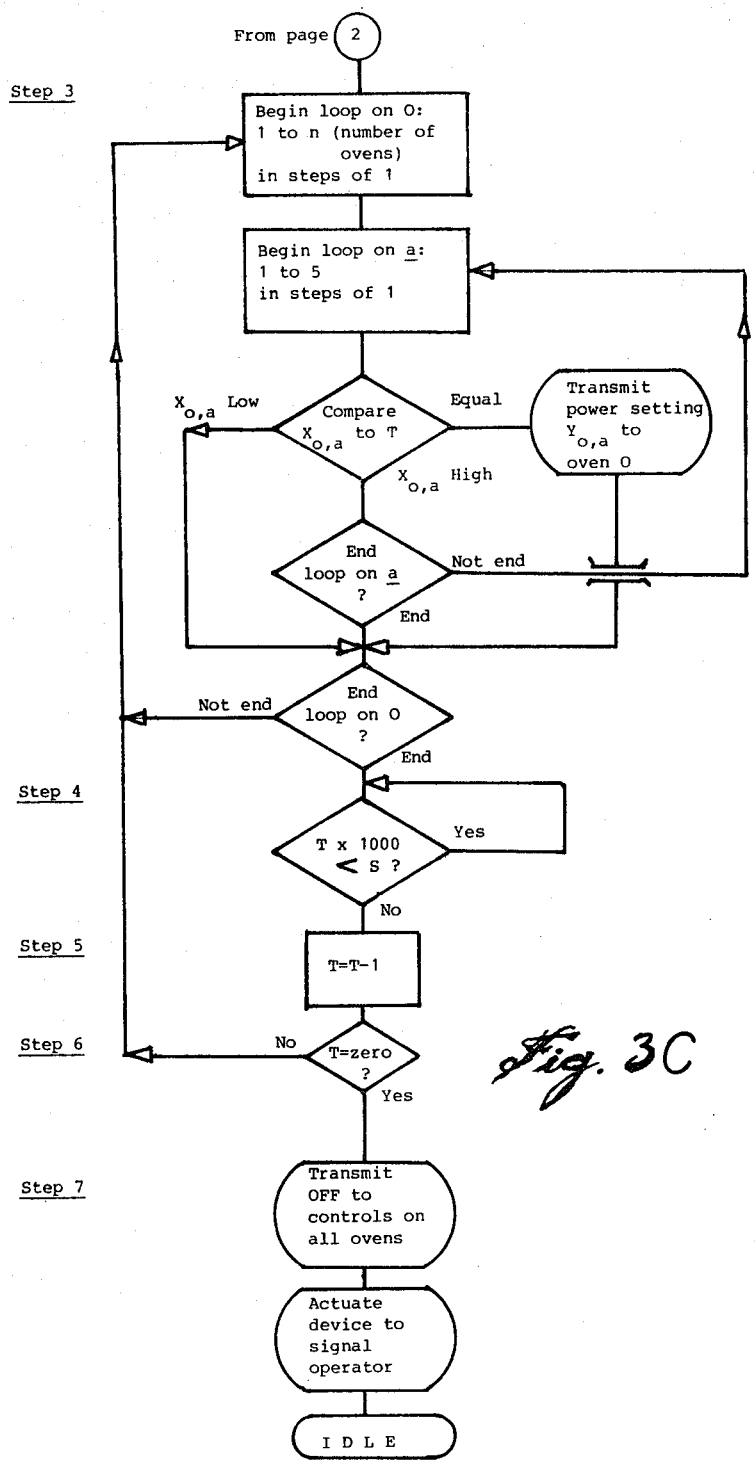

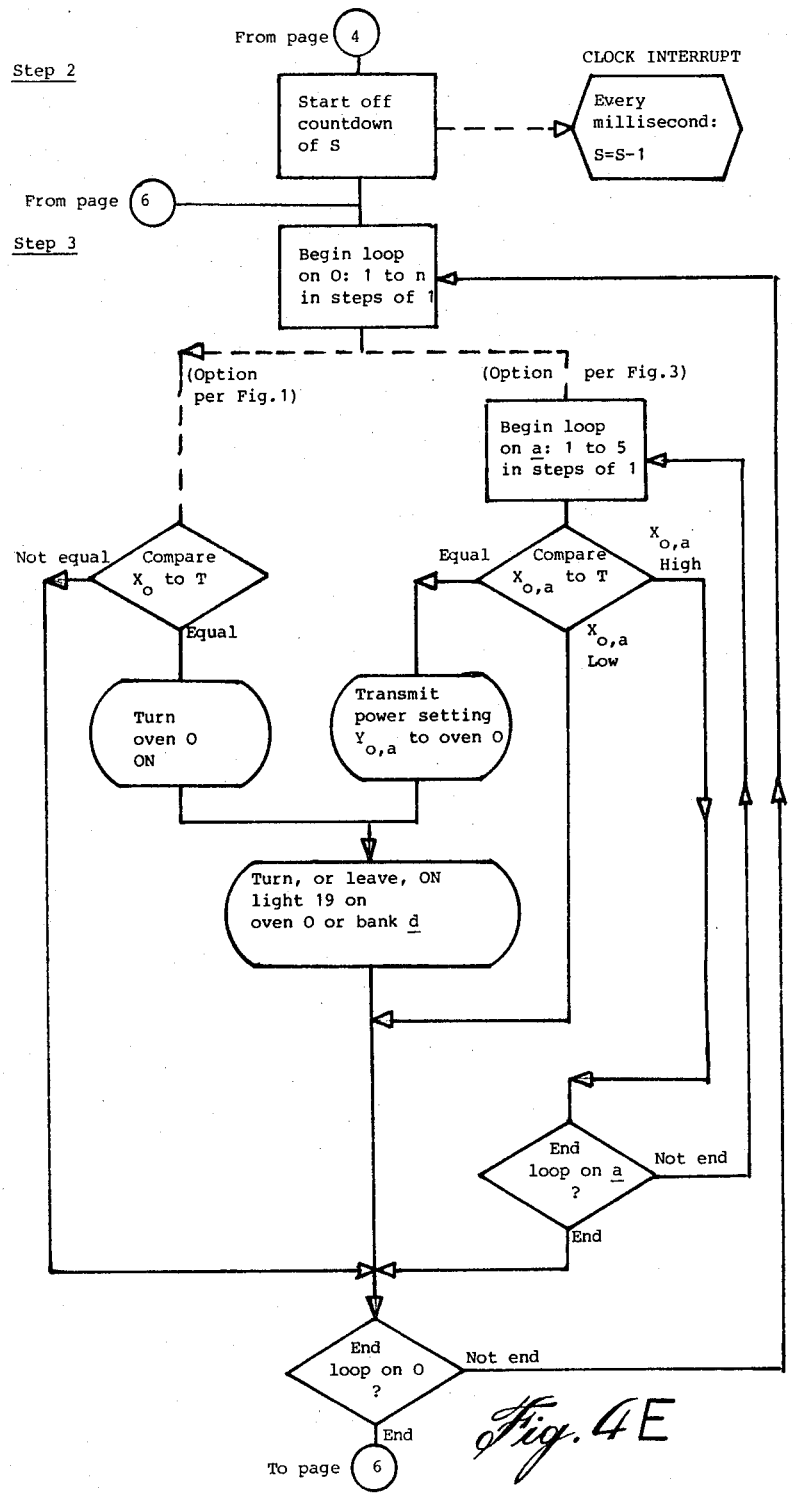

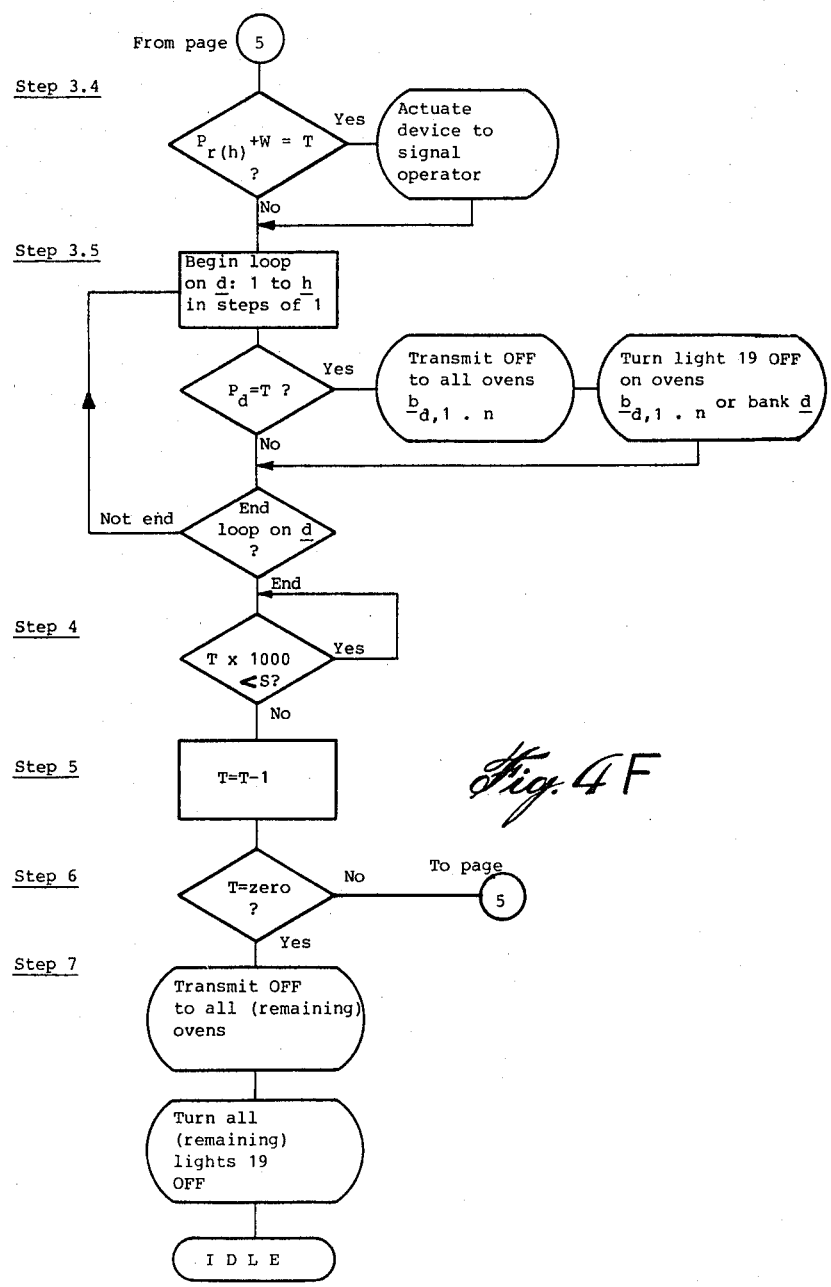

MICRO-WAVE OVENS

BACKGROUND OF INVENTION (a) Field of Invention

The invention relates to an electronic system for preparing portions of food in a plurality of microwave ovens. More specifically, the invention relates to such an electronic system wherein the plurality of ovens are controlled from a central source. The invention also relates to a method of preparing portions of food in a plurality of microwave ovens using the said electronic system.

(b) Description of Prior Art

Microwave ovens are known in the art. Electronic controls for individual microwave ovens are also known in the art. However, different foods, depending on the nature and state of preparation of the portion to be processed in the microwave oven, and also depending on the mass of the individual portion, have different overall processing times in a microwave oven.

Thus, for example, in a restaurant which may possess a plurality of microwave ovens, where people at one table order foods requiring various processing times, an operator has to be on the lookout to remove appropriate portions of food from respective ovens as they become ready. This is inconvenient for the operator and uneconomic of his time, and it is also inconvenient for the customers who will either receive their portions of food at different times, or if they all receive their portions of food at the same time, then some of the portions will be cold.

In order to have the different portions of food become ready at the same time, which would be most convenient for the operator and most economic of his time, and which would provide the best service to the customer, the individual ovens would have to be turned on at appropriately different times, i.e. the oven containing the portion with the longest processing time would have to be turned on first, and the ovens containing portions with lesser processing times would have to be turned on at appropriate intervals later. This again is inconvenient for the operator and uneconomic of his time.

Note that this problem would be mitigated, but not solved, if the operator calculated the point in time for each oven at which it should be turned on so that the processing for all of the ovens in the plurality would terminate at the same moment; but, apart from the inconvenience of, and cost of time in, making the aforesaid calculation, the operator would still have to remind himself when to turn on each oven, and he would still have to return to the scene at each point in time in order to turn each oven on. Hence the problem of inconvenience for the operator and the cost of his time would remain. Moreover, owing to human error, ovens would probably not be turned on at the right times, and the portions of food would be ready at the wrong times, resulting in loss of customer satisfaction, either because of the delay, if the oven in question had been turned on too late, or because of the portion of food being cold, if the oven had been turned on too soon.

It is also known in the art for the electronic controls on microwave ovens to include a time-of-day feature, one of the benefits being that the digital display usually accompanying the electronic control can also be used, when the oven is not occupied, to display the time of day, i.e. to serve as a clock. It is further known to include the additional feature that the process in the oven be automatically turned on in such a way as to end at a set time of the day (a feature somewhat comparable to a similar feature that has existed for some years on conventional electric or gas ranges).

If a plurality of microwave ovens were each equipped with the time-of-day clock and also with the additional feature of automatically being turned on in such a way as to end at a set time of the day, then it would be possible to mitigate the problem described earlier, as follows: First, it would be necessary to ensure that the time-of-day clock settings for all the ovens in the plurality were synchronized. Secondly, the operator would have to calculate the expected time in the day when the portion of food with the longest processing time was expected to finish. Thirdly, the operator would then have to enter that same completion time of day for each of the ovens, along with the individual instructions for processing.

This method of using a plurality of microwave ovens would appear to come closest to a solution to the problem as it eliminates the need for the operator to make repeated visits to the plurality of ovens in order to turn each one on at the appropriate time. However, it leaves him with the problem of selecting the oven with the longest processing time, which is not necessarily easy to do as the more sophisticated processing programs involve a consecutive series of power settings, each with its own length of processing time; and it also leaves the operator with the problem of calculating the time of day of expected completion of the longest program.

This is relatively error-fraught as minutes and seconds are in sets of sixty, rather than being based on the generally-used decimal principle, and the hours part of the time is duodecimal rather than decimal, being furthermore burdened either with the need to watch for A.M. and P.M. or, alternatively, the unfamiliar 24-hour clock convention. The probability of error is magnified in the two most common situations of use of microwave processing of food, namely, in the food-service industry which relies heavily on employees who are young, inexperienced, unskilled, and lack the positive attitude to work that enhances accuracy; and in the home, where experience in the marketplace has shown that housewives have a negative attitude to microwave ovens with controls that appear to be complicated.

The probability of error is further magnified when it is borne in mind that both the operator in the restaurant and the housewife in the kitchen are frequently interrupted in the course of their duties and may find that they have not had the chance to turn on all of the ovens after starting one of them; or that the time of day for completion which had been calculated before the interruption needs to be calculated again.

Besides the problem of managing a plurality of ovens so that different types of portions of food can be ready to serve at the same time, there is also the problem that a plurality of microwave ovens is costly, insofar as the electronic (or, possibly, in some models, the electromechanical) controls are repeated for each oven. This problem of cost, which exists wherever it is desired to process more than one type of food at the same time, is particularly onerous in the domestic situation where it is very uncommon for the housewife to possess more than one microwave oven. In this situation, the user must either restrict her use of the microwave oven to just one food at a time, or (and this is a frequent recommendation by the manufacturers of microwave ovens) she must carefully arrange the various types of foods according to their type and acccording to their mass, combined, in such a way that the complete contents of the oven are ready at one time. Such a careful arrangement takes a degree of skill and experience that is not possessed by many users or which potential users are often unwilling to acquire.

The problem of cost, while most readily described in terms of the domestic user, also exists in the food-service trade, where, for example, a restaurant may possess two or three microwave ovens, but cannot afford to own, say, thirty microwave ovens when each one requires separate controls and, hence, cannot apply microwave processing on a scale that may otherwise be desirable.

While the cost of the controls that are repeated in each unit in a plurality of ovens is a problem, there are also other elements such as the digital displays and the keyboard or equivalent input devices, and the physical outside housings which protect five of the six sides of the rectangular cubic shape of each oven and which are redundant to the extent to which a plurality of ovens can be ranged alongside each other, horizontally, and/or stacked on top of each other, vertically; all of which represent costs, repeated for each oven in a plurality, which discourage the acquisition of a plurality of microwave ovens or which prevent the acquisition of larger numbers of microwave ovens where such larger numbers would otherwise be warranted.

The sets of hardware, such as hinges, handles, and mouldings, associated with the individual doors of the ovens, also represent a cost which discourages the acquisition of a plurality, or larger pluralities, of microwave ovens. In the case of doors, the fact that, when a plurality of ovens are used together to process foods that are to be served at the same time, the operator must open the door to each oven separately, is also inconvenient.

All of the foregoing drawbacks in the prior art, cumulatively, result in one final drawback insofar as the domestic and the small food-service, as opposed to the larger food-service, user is concerned, namely the lack of small microwave ovens for use in the home or small restaurant. This lack exists, not because the prior art stands in the way of such smaller ovens (indeed, there are microwave ovens that are smaller than the common domestic models, available to the food-service trade), but because the high cost and inconvenience of trying to use a plurality of microwave ovens in the prior art cause the potential market to be too small to justify their production; which also produces an additional drawback in that even the housewife or owner of a small restaurant who is willing to pay the price for a plurality of microwave ovens and who is willing to overlook the inconveniences enumerated above, may not be able to spare the space in the kitchen for the plurality of ovens; for the manufacturers of those ovens must take a large size of cavity as the lowest common denominator of execution of the prior art; generally big enough to accommodate a medium-to-large size turkey, but no smaller. The attraction of such a common denominator is obviously great, witness the fact that domestic microwave ovens manufactured in several countries are all almost the same size.

SUMMARY OF INVENTION

It is the principal object of the invention to provide a plurality of microwave ovens sharing a single common electronic system of control that will enable the processing of various portions of food that are to be served at the same time, so that the operator need intervene at only two points in time:

(1) The first, to load the portions of food into the ovens and to set the controls;

(2) the second, to remove the processed portions of food from the ovens so that they can all be served forthwith.

In order to accomplish the principal object, the aforesaid single common electronic system of control is to be capable of accepting and storing, at one time, the operator's instructions for processing the contents of every one of the ovens in the plurality, and then of causing the execution of those instructions so that the processing of the contents of every one of the ovens in the plurality is completed at the same time.

It is also an object of the invention to reduce the cost of a plurality of microwave ovens by sharing the aforesaid single system of control, and by sharing such components as the outer housing and the oven doors.

It is also an object of the invention to provide various optional conveniences and safeguards, consistent with the above-mentioned objects.

In accordance with the invention, there is provided a system comprising means for accepting and storing instructions consisting of all the individual processing times for a plurality of microwave ovens and then for automatically carrying out those instructions so that the processing for all of the said ovens is completed at the same time.

Further in accordance with the invention, there is provided a method of accepting and storing instructions consisting of all the individual processing times for a plurality of microwave ovens and then automatically carrying out those instructions so that the processing for all the said ovens is completed at the same time.

Still further in accordance with the invention, there is provided a system comprising means for accepting and storing instructions consisting of all the individual series of consecutive power settings, each of said settings with its individual processing time, for a plurality of microwave ovens, and then for automatically carrying out those instructions so that the processing for all of the said ovens is completed at the same time.

Still further in accordance with the invention, there is provided a method of accepting and storing instructions consisting of all the individual series of consecutive power settings, each of said settings with its individual processing time, for a plurality of microwave ovens, and then of automatically carrying out those instructions so that the processing for all of the said ovens is completed at the same time.

In accordance with a specific embodiment of the invention, there is provided means for accepting and storing the time values representing the processing time of respective portions in respective ovens; clock means; means for selecting the longest of the said time values; means for counting down the time remaining in said longest time value, as clocked off by the said clock means; means for comparing, at predetermined intervals, each said time value, one at a time, with the said time remaining, and for turning on a respective oven when its time value is equal to the time remaining; and means for turning off all the ovens when the said time remaining has reached zero.

In accordance with a further embodiment of the invention, there is provided means for accepting and storing, in desired order of execution, a series of codes representing the consecutive power settings and the series of time values representing the processing time for each of the said series of power settings, for each of the respective portions in respective ovens; clock means; means for calculating and storing, for each of the said power settings, the sum of the said time value for that setting and the time values for all subsequent settings, for each of the ovens; means for selecting the greatest of all said sums of time values; means for counting down the time remaining in said greatest sum of time values, as clocked off by the said clock means; means for comparing, at predetermined intervals, each said sum of time values, one at a time, with the said time remaining, and for turning the power to a respective oven to the setting represented by a power setting code when the respective sum of time values is equal to the time remaining; and means for turning off all the ovens when the said time remaining has reached zero.

From a different aspect, and in accordance with the invention, there is provided a process of accepting and storing the processing time for the respective portions in the respective ovens; selecting the longest of said processing times; counting down time remaining, as measured by the clock, and comparing said time remaining to the processing times of the individual ovens; turning on each respective oven when the said amount of time remaining is equal to the processing time; and turning off all the ovens in the plurality when the said time remaining has reached zero.

In accordance with the latter aspect, there is further provided a process of accepting and storing, in desired order of execution, a series of codes representing the consecutive power settings and their corresponding processing times, for the respective portions in the respective ovens; calculating and storing, for each of the individual power settings, the sum of its processing time and the processing times of all the subsequent power settings for the same oven; selecting the greatest of all the said sums; counting down time remaining, as measured by the clock, and comparing said time remaining to the said sums of the processing times; turning the power to an oven to the setting represented by one of its codes when the corresponding sum of processing times is equal to the time remaining; and turning off all the ovens in the plurality when the said time remaining has reached zero.

BRIEF DESCRIPTION OF THE DRAWINGS

The invention will be better understood by an examination of the following description, together with the accompanying drawings in which:

FIGS. 3A, 3B and 3C is a block diagram of the microprocessor program for the invention with the option of processing with a consecutive series of power settings for each oven, each setting with its own length of processing time.

FIGS. 4A to 4F is a block diagram of the microprocessor program for the invention with, among other options, the optional optimized cascading completions of subsets of ovens.

DETAILED DESCRIPTION OF THE DRAWINGS

Figure 1:
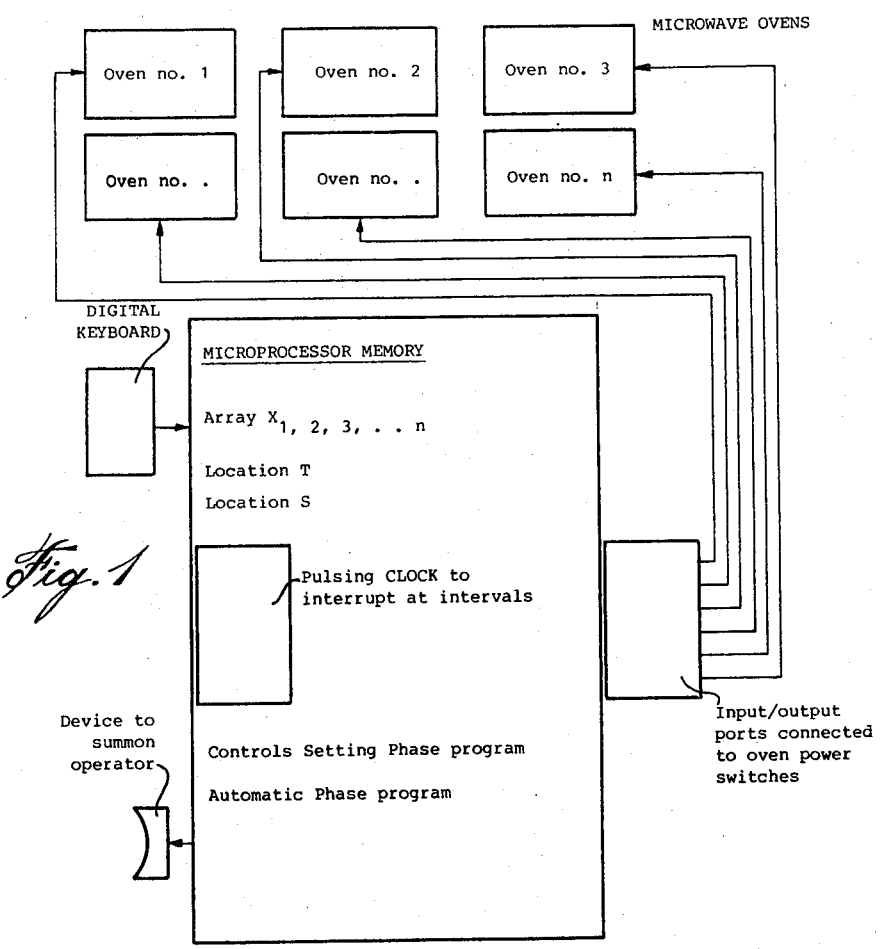
FIG. 1 is a schematic representation of the basic invention in its simplest form.

Referring now to FIG. 1 of the drawings, each microwave oven in the plurality has its own fixed reference number 1, 2, 3, or ... n, associated with an input/output port number on the microprocessor. For the sake of simplicity, the port number is assumed to be the same as the associated fixed reference number. Thus, a digital signal for ON (say, a "1" bit or a row of "1" bits), sent through, for example, port number 4, will activate the switch to cause the power for oven number 4 to be turned on; and a digital signal for OFF (say, a "0" bit or a row of "0" bits) sent through port number 4 will activate the same switch to cause the power to oven number 4 to be turned off.

The digital keyboard has ten keys 1, 2, 3, ... 9, 0, plus at least one non-digital key. For ease of exposition, now assume that it has the same layout as the common touch-tone telephone keyboard (Component number 27, FIG. 2).

FIG. 1 illustrates the invention in its simplest form, and the following narrative describes the microprocessor program for the invention in that same simplest form.

Controls setting phase

Step A: As the operator loads each oven, he enters, as Step B, two values via the digital keyboard; first, the oven number, and then, the amount of microwave processing time, by convention in minutes and seconds, for the portion of food loaded into that oven. The non-digital keys are used to differentiate the two values.

Now assuming that the convention is that the completion of the entry of the oven number is signalled by the "*" key, and that the completion of the entry of the processing time for that oven is signalled by the "#" key, and if, for example, the operator has loaded oven number 12 with a portion of food requiring 4 minutes 37 seconds of microwave processing time, the operator keys in "1,2,*, 4,3,7,#."

On receipt of the "*," the microprocessor program locates within the processor's memory the parameter storage location for oven number 12, called, by convention, $X_{12}$. On receipt of the "#," the program stores the value 277 (4 min. 37 sec. in seconds) in location $X_{12}$.

Steps A and B are repeated for each of the ovens that will be used so that the array of memory locations $X_{1,2,3...n}$ contains a positive value in each element, or else zero for each oven not being used in the particular case, since each element in the array X corresponds to an oven reference number.

With Steps A and B completed, the operator performs Step C which is to instruct the microprocessor to start its automatic program. This instruction is entered by a conventional use of the keyboard, for example, by pressing the "*" key three times in succession. On receipt of the "*,*,*," the microprocessor proceeds to Step 1 of the automatic phase. The operator may now leave the scene.

Automatic phase

Step 1: The program scans the values in the array $X_{1,2,3,...n}$ and selects the highest one. That highest value is stored in a memory location called, by convention, T.

That same highest value is also stored in a memory location called S but it is first multiplied by the inverse of the basic fraction of a second (or of whichever other time unit is used) provided by the program "interrupts" emitted by the pulsing clock. For the sake of simplicity, now assume that the clock interrupts the microprocessor once every millisecond or one-thousandth of a second. In that case, the value of S is the highest value out of the array $X_{1,2,3,...n}$ times 1000.

Step 2: The program starts the countdown of S. The countdown takes place as follows: The pulsing clock component of the microprocessor interrupts the automatic program once in every, in this example, millisecond. On receipt of this interrupt, the program momentarily stops whatever it happens to be doing, subtracts 1 from the value stored in location S and stores the result back in S.

For example, if the portion of food with the longest microwave processing time required is in oven number 7, and its microwave processing time is 8 minutes 23 seconds, then the value stored in element $X_7$ will be 503 (seconds), and the initial value in S will be 503000. After the first interrupt, the value of S will be 502999; after the second interrupt, it will be 502998; and so on. After starting off the countdown of S, the program proceeds to Step 3.

Step 3: The program scans the array $X_{1,2,3,...n}$ to see if the value in any of its elements is equal to the value stored in location T. (It will be obvious that on the very first execution of this step it will find that, in the same example, the value in the element $X_7$ is the same as the value in T, as that is what was just stored there in Step 1.)

If the equality is found, (now still assuming that port numbers are in direct correspondence to element, i.e. oven numbers) in this example, the signal to turn the oven ON is sent through port number 7. As port number 7 is wired to the on/off switch for oven number 7, this results in oven number 7 being turned on.

If none, or no more, of the elements in the array $X_{1,2,3,...n}$ are equal to the value stored in location T, the program proceeds to Step 4.

Step 4: If the value stored in location T, when multiplied (in this implementation example) by 1000, is less than the value stored in location S, then the program waits (in practice, by repeating Step 4). Again, it will be apparent that on the very first passage through this step the value in T will not be less than the value in S for, in the same example, T starts off with a value of 503, so T times 1000 is 503000. S will have been counted down from 503000 even while oven number 7 was being sent the ON signal, in Step 3, so perhaps fifteen milliseconds will have elapsed by the time the first passage through Step 4 takes place.

If the value stored in location T, when multiplied by 1000, is not less than the value currently stored in location S, the program proceeds to Step 5.

Step 5: The program substracts 1 from the value stored in location T, stores the new value back in T, and proceeds to Step 6. In effect, T always contains the time remaining to completion, accurate to within one, in this case, second.

Step 6: If the value stored in location T is not zero, the program goes back to Step 3. Sooner or later, each of the non-zero elements in array $X_{1,2,3...n}$ will, during some execution of Step 3, be found equal to the value in T, and each corresponding oven turned on.

If the value stored in location T is zero, the program proceeds to Step 7.

Step 7: Every input/output port is used to send out an OFF signal. This results in every oven being turned off. The program also sends an output signal through a separate input/output port wired to the visible and/or audible device to cause that device to signal to the operator that the microwave processing is complete. The operator returns to the scene, unloads the ovens, and serves the food.

Figure 2:
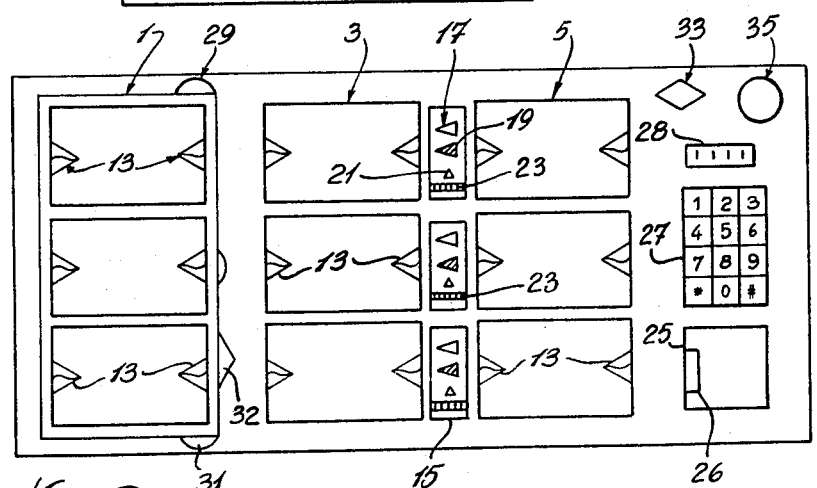
FIG. 2 is a front view of the system illustrating the various components, both basic and optional.

Referring now to FIG. 2 of the drawings, 1, 3 and 5 each represent a bank of three microwave ovens, each bank with its common door (shown for bank 1). It will be appreciated that more than three ovens could be included in a bank, or that all of the ovens in the system could be considered a single bank of ovens. It will also be appreciated that some or all of the ovens can still have individual doors; and that the banks can be arranged horizontally or in rectangular sets; and that the doors can be oriented in more than one direction, e.g. facing outward on two or more faces of a rectangular central cubic housing. The doors may also be hinged at the top or bottom instead of at one side, or they may be of the folding type, single or double, opening either horizontally or vertically. It will also be appreciated that the cavities of the various ovens may be of different sizes.

Each oven has a pair of magnetrons 13, as is well known in the art, and each oven could have its own display panel 15. Each display panel may include a light 17 which is turned on when that particular oven is having its controls set (Step B, FIG. 1), and it may also include a light 19, of a different colour and/or shape from light 17, which would indicate that the oven is turned on. There may be only one light 19 for a bank of ovens, to indicate that at least one of the ovens in that bank is operating. The display panel may also contain a digital display 21 to show the particular power setting currently applied to the oven (if such optional power settings are included), conventionally expressed as a single digit representing the proportion of full power, e.g. 7 would mean 70 percent, or as a fraction or decimal or as a letter or word, e.g. F or FULL or T or THAW or S or STAND (nil power), all as well-known in the art.

Each display panel may also contain a digital display 23 which can be used to show, at entry by the operator (Step B, FIG. 1), the overall processing time in, conventionally, minutes and seconds; optionally, that amount of time can remain displayed until the oven is turned on; or until completion; or, optionally, after the oven has been turned on, the continually changing amount of time (in effect, the value of T —see discussion of FIG. 1 above —expressed in minutes and seconds) to completion of processing, all as well-known in the art. Optionally, as is known in the art, display 23 may also be used to show the time of day, either A.M. and P.M. or on the 24-hour convention, when the oven is not in use.

There is one microprocessor 25, including a pulsing clock 26. The microprocessor may optionally be programmable, or it may optionally be capable of accepting installation parameters such as number of ovens in the system and options included, or these may instead be built in by "hard" encoding on a microprocessor chip or other memory vehicle; with parameter and/or option change by means of field engineering change or addition or "uncovering" of other "hard" encoding; all as well-known in the art.

There is a central digital keyboard 27 with the ten standard digits and at least one non-digital key. There can be additional non-digital keys, some or all of which can each have a fixed function and be so labelled e.g. START. The keys may be push-buttons or pressure- or heat-sensitive flush pictured shapes with back-lighting to confirm the operator's finger pressure; all as well-known in the art.

Instead of, or in addition to, the central digital keyboard, there may be a digital keyboard for each oven (not shown), in which case the operator need not identify the oven number when setting controls as that datum would be implicit in the input port number through which the keyboard would be wired to the microprocessor. If the individual keyboards are instead of, rather than in addition to, the central keyboard, then one of them, either permanently designated, or chosen by the operator, would serve for such central functions as START. It will further be appreciated that, in the absence of the central digital keyboard, instead of requiring the use of one of the individual oven keyboards, each central function could be instructed to the microprocessor by means of a specially labelled and designated key, e.g. START (not shown).

Instead of, or in addition to, the central digital keyboard, there could be an optical character reader (not shown) connected to the microprocessor to read in processing times, or power settings and processing times, pre-printed in an optical character reader type font on packaged food portions, as known in the art. There may also be buttons for pre-set processing times, as known in the art (not shown).

There is a central digital display 28 to repeat back to the operator the data that he is entering and to display any error messages or instructions from the microprocessor. It may also be used during the automatic program running to show the time to completion (the value of T expressed, conventionally, in minutes and seconds). If each oven has its own display 23, then display 28 need not be present, in which case messages or data not associated with an individual oven can be shown on one of the individual displays 23 designated for that function.

Component 29 is an optionally provided door lock and component 31 is an optionally provided device for detecting that a door is not properly shut; both as known in the art. Component 32 is a spring-loaded device for pushing open a door when the processing of the contents of the ovens behind that door has been completed, as known in the art.

Component 33 is an optionally provided visible device to summon the operator when he is to return to begin unloading the ovens when the first bank, or all, of them have completed the processing of their respective portions of food. This may be a light, or set of lights, which the operator may switch off manually, or which goes out when the first oven door is opened (if optional detector 31 is present), or at the end of a fixed interval of time with or without intermittent further operation; all as known in the art. In a large food-service establishment, this device may take the form of one of a set of numbered lights on a panel, as known in the art.

Component 35 is an optional audible device which may be comprised of, or in addition to, a remote "pager" carried on the operator's person. It may also be a loud-speaker broadcasting digitally-encoded "voice" messages, as known in the art, e.g. "Oven unit number 10 ready" or, if an operator I.D. number has been optionally entered (at Step B of FIG. 1), the "voice" can say, e.g. "Paging operator number 3." The device can be turned off in the same way as visible device 33.

Figure 3A:
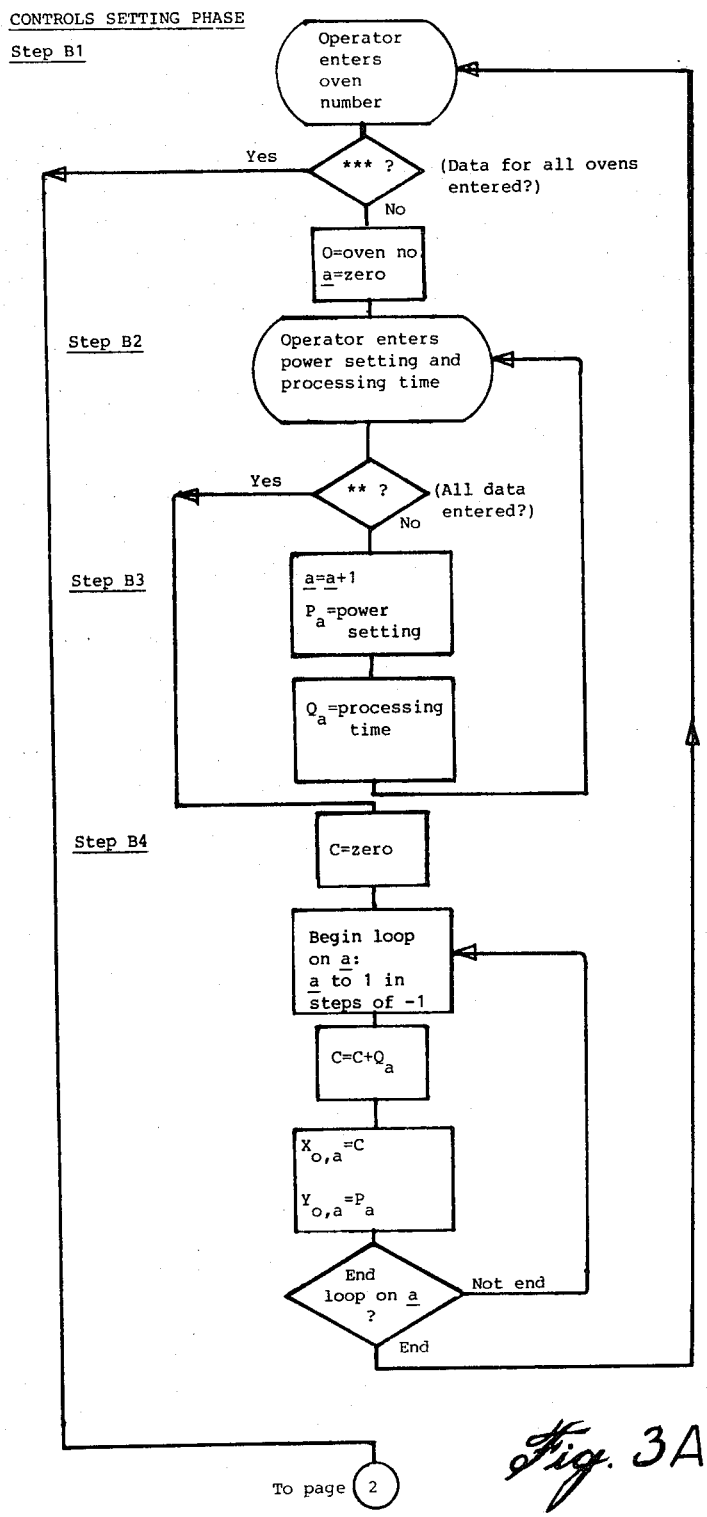
Figure 3B:
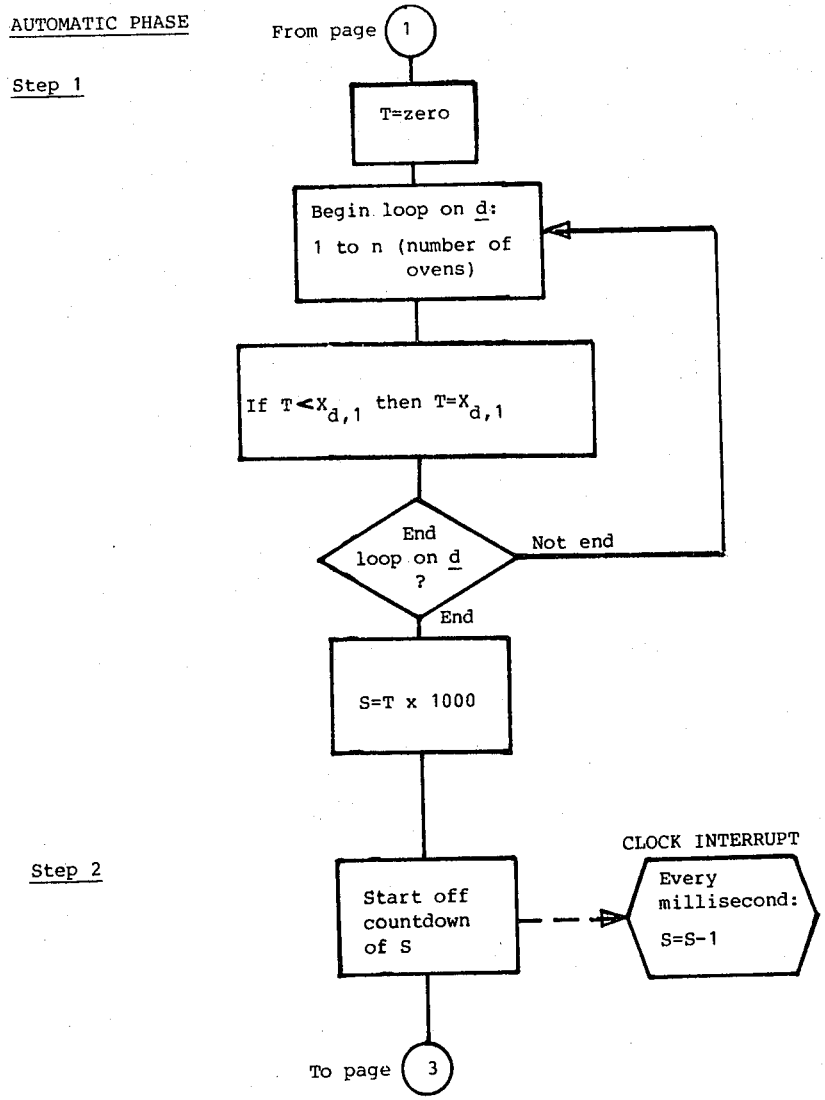
Figure 4A:
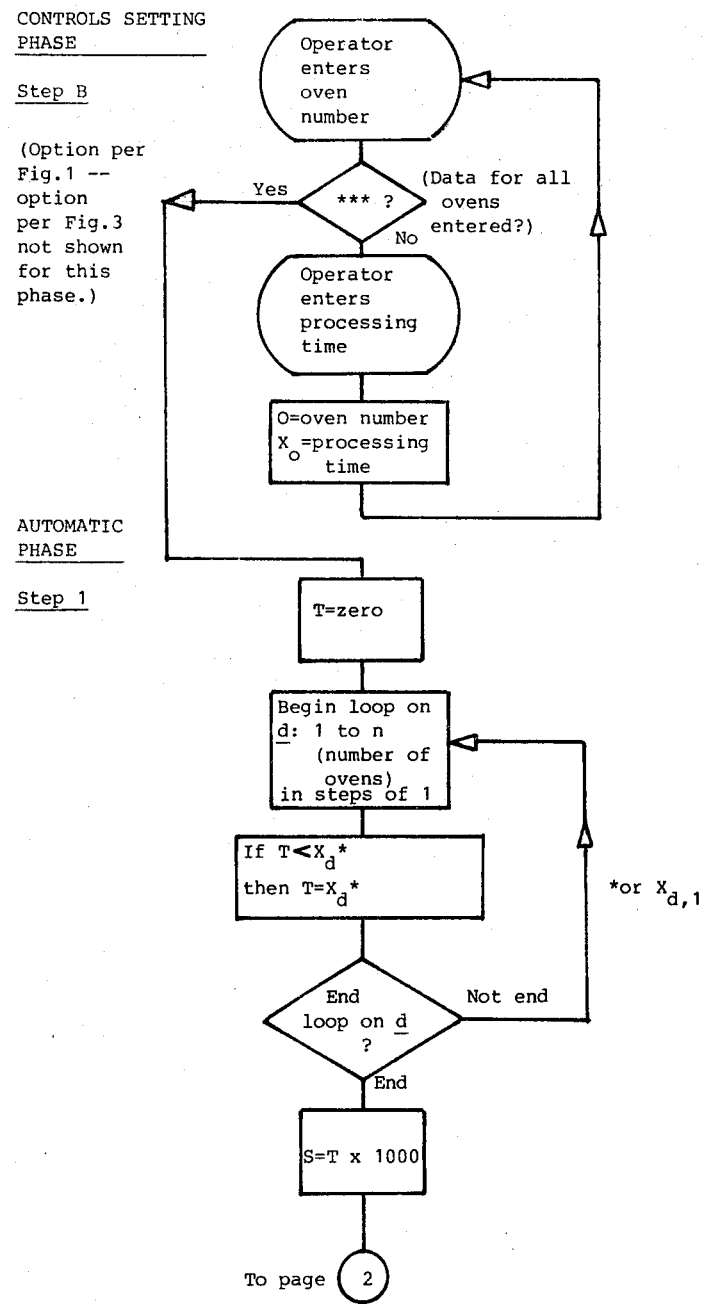
Figure 4B:
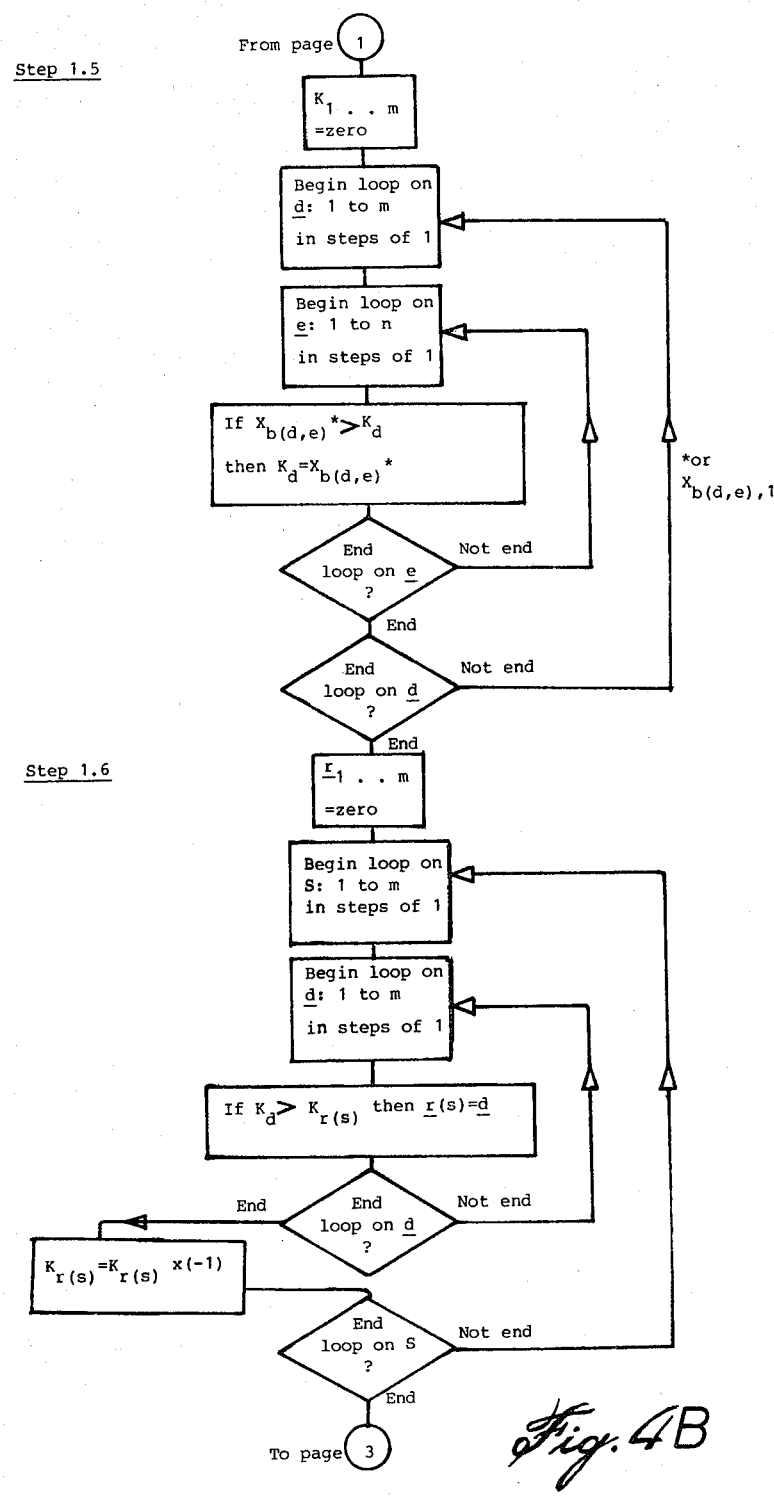
Figure 4C:
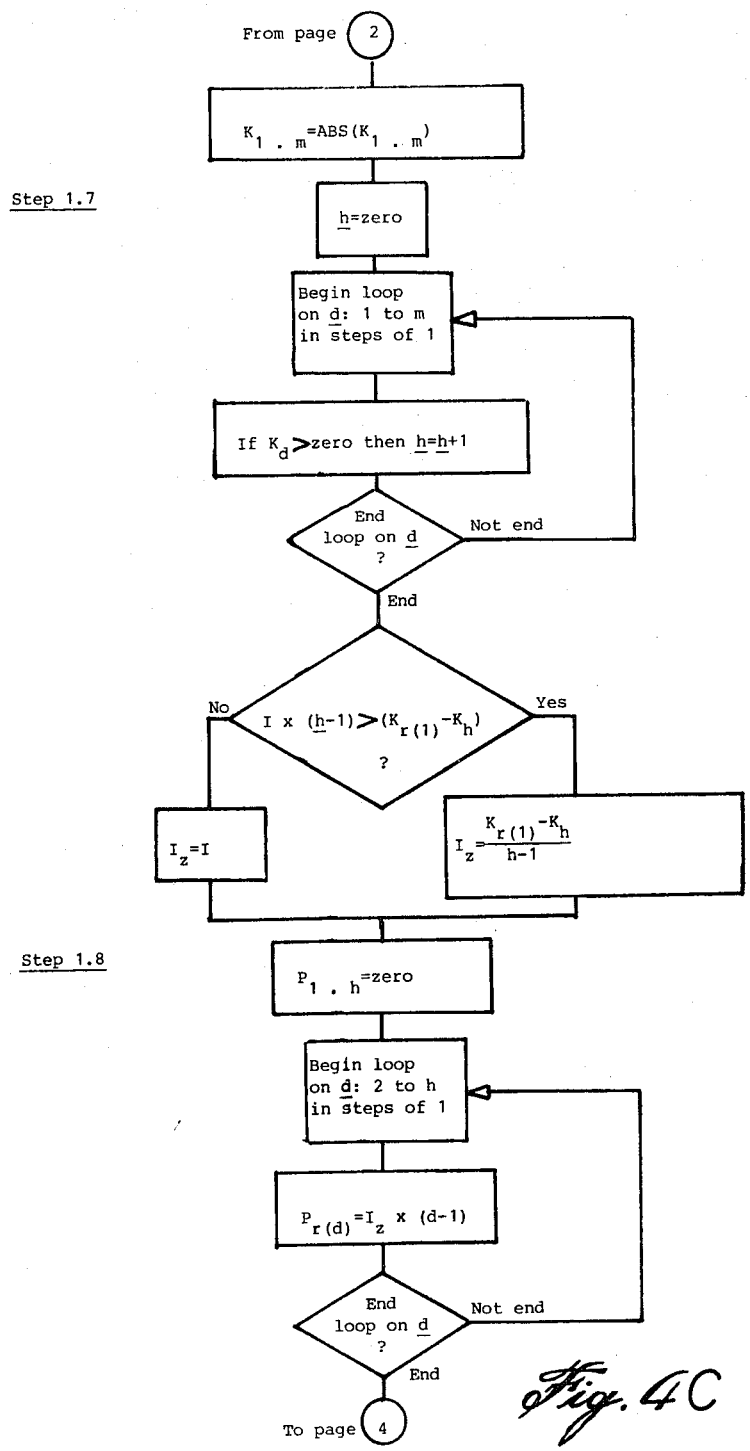
Figure 4D:
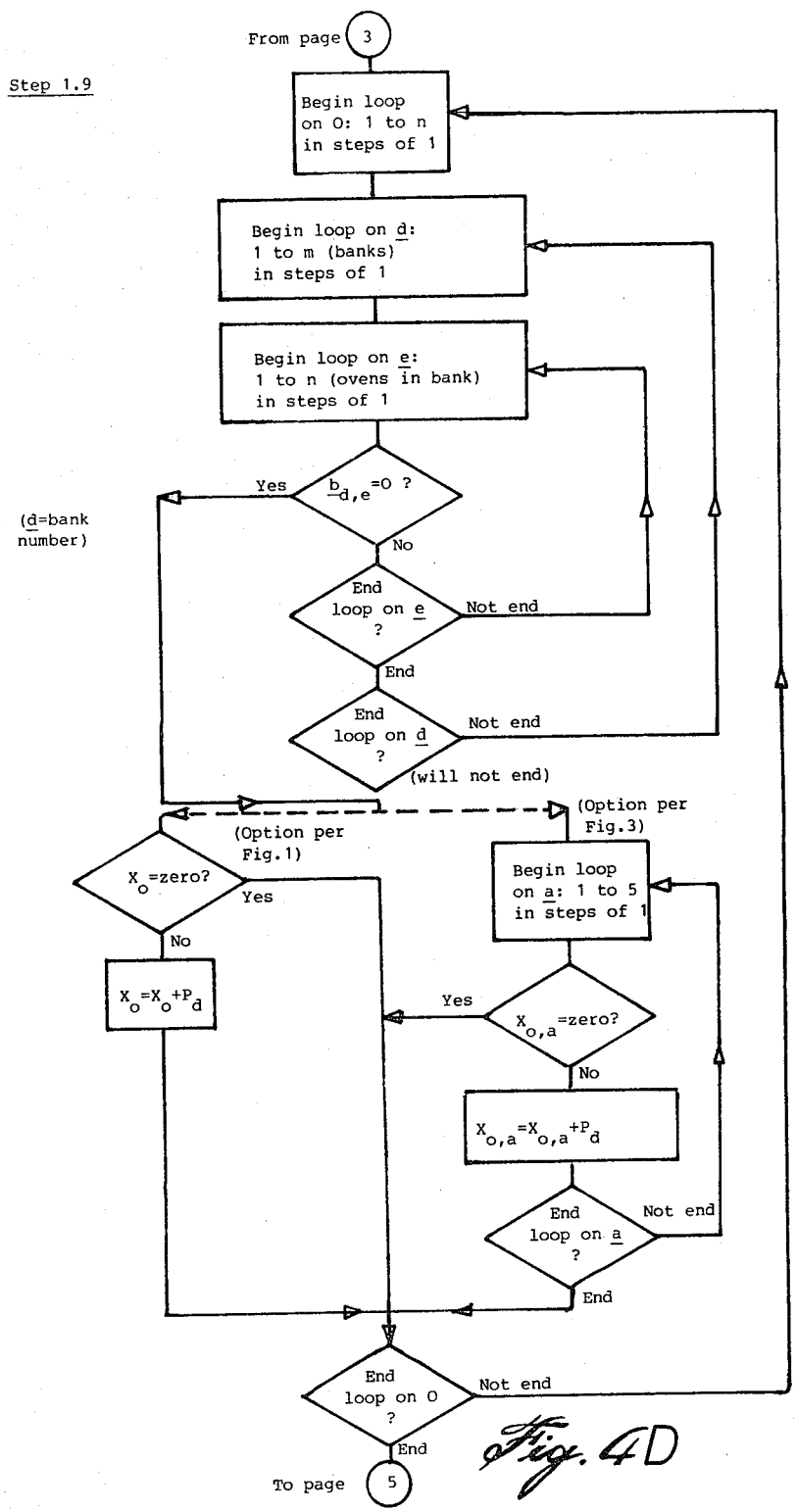

Referring now to FIGS. 3A to 3C of the drawings; as mentioned earlier, it is known in the art to accept, store and execute a consecutive series of power settings, each with its own length of processing time, for a microwave oven. FIG. 3 is a block diagram of the microprocessor program as an optional part of the invention to provide this capability for the plurality of microwave ovens. The steps are lettered or numbered to correspond to the parallel steps in FIG. 1 of the drawings.

Controls Setting Phase

Step B1: After the operator has loaded an oven with a portion of food, Step A, he uses the central digital keyboard to enter the oven number followed by, in our example, the character "*." (Note: Error routines, which are standard practice in the art, are not shown.) The oven number is stored in a memory location called, for example, O, and the oven number is also shown to the operator on the central digital display. The program proceeds to Step B2.

Step B2: The operator enters the digital code for the first power setting, followed by the conventional character "#," followed by the associated length of microwave processing time, in, by convention, minutes and seconds, again followed by the "#." For example, to enter power setting "7" (which may, for example, represent the requirement of approximately 70 percent of power to the magnetrons) to last 2 minutes 24 seconds, the operator enters "7,#, 2,2,4,#." At the start of Step B2, the program sets a memory location called a to the value zero. a stores the count of the number of consecutive power settings entered in this step. In this example, it is assumed that the maximum number of such consecutive settings for each oven is 5. The two values are shown on the central display.

Step B3: The program adds 1 to the value of a and stores it back in its location. It then stores the power setting code in a memory location $P_a$ which is the ath element in an array P, and it stores the length of processing time, converted to, in this case, seconds, in a memory location $Q_a$ which is the ath element in an array Q. The program then returns to Step B2.

Steps B2 and B3 are repeated until all of the power settings for the oven O have been entered. At that point, the operator enters, in this example, "**." On receipt of this code, the program proceeds to Step B4.

Step B4: The program transfers the data from location O and array Q to an array X, and the data from location O and array P to an array Y. (It will be appreciated that there are several ways to store the data in the microprocessor memory, all known in the art; this being only an example.)

Array X is in two dimensions, the ordinate being the oven number and the abscissa the length of time from the start of the power setting to final completion. At the beginning of Step B4, the value of a time counter C is set to zero.

The program scans the array Q backwards from the ath element to the first. For each such element, it adds the value in $Q_a$ to the value of C, re-stores the new value of C, and also stores the latest value of C in element $X_{o,a}$. The program also scans the array P backwards from the ath element to the first, and transfers the value in $P_a$ to the element $Y_{o,a}$. After these two processes, the value of a is reduced by 1 and the scan resumes.

Thus, each consecutive element in the array X for a particular oven contains the sum of the microwave processing time for that power setting plus the cumulative processing time for all subsequent power settings; and the corresponding element in the array Y contains the corresponding power setting code.

When the scan is completed, the arrays P and Q are cleared and the program returns to Step B1, to accept the control settings for the next oven loaded.

In Step B1, after the controls for all the ovens used have been set, the operator proceeds to Step C by entering a code by START, say, "***." On receipt of this code, the program proceeds to its automatic phase. The operator may now leave the scene.

Automatic Phase

Step 1: The program scans the array X to find the oven with the longest overall microwave processing time, which will be stored as T. In this step, only the first element for each oven need be examined as it must have a longer overall time to completion than any of the subsequent elements for that oven. When this scan is completed, the value of S is set, in this example, to T times 1000. (Virtually the same as for FIG. 1).

Step 2: The countdown of S is started off, as described above in association with FIG. 1.

Step 3: This step is more elaborate than its counterpart in FIG. 1. All of the elements in array X for each oven are scanned until either there is one element equal to T or the first element, within the set for an oven, with a value less than that of T (too early) is encountered. Then, instead of simply turning the oven on by sending an ON signal through the input/output port for the appropriate oven, the corresponding element in array Y, assuming, for the sake of simplicity, that the code can be used as it is, is sent out through the port to a digital control that causes the power to flow to the magnetrons of that oven according to the code, as is known in the art. This may include power OFF because nil power is one of the possible settings, to have the contents of the oven "stand" for a specific length of time.

Steps 4, 5, 6 and 7: These are the same as described above in association with FIG. 1 except that reference to turning power on read turning power to desired setting.

Referring now to FIGS. 4A to 4F of the drawings, by way of background explanation, it will be appreciated that where a fairly large number of microwave ovens are used together, in the invention, and all of the portions of food become ready at precisely the same instant, there is a delay between the removal and serving of the contents of the first oven that the operator decides to unload and the removal and serving of the contents of the last oven that he unloads. There is also to be considered, regardless of the number of ovens used, an earlier delay between the actuation of the device to summon the operator and his arrival on the scene to begin unloading the ovens.

These delays, while measured perhaps only in fractions of minutes, can be costly in restaurants that are competing, in part, on the basis of speed of service. Since the invention can be used to thaw and heat precooked deep-frozen individual portions of food, whose microwave processing times typically range between about one and eight or nine minutes, the delays are considerable when thought of as a proportion of the whole. Such delays also reduce the potential throughput of the invention, since the sooner the prepared food portions are removed from the ovens, the sooner the system can be used again.

It is for these reasons that two particular options are included:

(1) Cascading completions of subsets ("banks") of the plurality of ovens so that the operator can unload and serve the contents of one bank of ovens while the others are still being processed; ideally so that just as he finishes unloading and serving one lot, the next bank of ovens becomes ready for his attention. There are two versions of the option: one in which the cascading completions take place in a fixed order of banks of ovens, and the other in which the microprocessor calculates the optimum order of completion of banks so that the bank containing the oven with the longest microwave processing time finishes last, the bank with the next-longest processing time finishes second-last, and so on, the bank with the shortest processing time finishing first. FIG. 3 illustrates the latter version of the option. The desired interval between completions is stored as a parameter called, by convention, I, which can be entered or changed by a simple program (not shown). The option consists entirely of a variation on the basic program.

The allocation of the ovens into banks is done prior to, or at, installation of the system, since this takes place in conjunction with the placement of the doors. The allocation is permanently recorded in the memory of the microprocessor, conventionally expressed as a two-dimensional array b of oven numbers in which the ordinates are the bank numbers, expressed as $b_{1...m}$ and the abscissas are the progressively numbered places within the bank, conventionally expressed as $b_{1...n}$. (2) An advance warning feature whereby the device to summon the operator is actuated a certain interval of time ahead of the time when his presence is required. The parameter for the desired interval can be entered or changed by using a simple program (not shown), as owners may wish to alter it from time to time. The option consists entirely of an additional program routine. The value of the parameter, expressed, by convention, in seconds, is stored in a memory location called, by convention, W. This option is incorporated into the drawing of the microprocessor program whose block diagram is FIG. 4.

With the cascading completion option, especially in its optimizing version, the operator, on returning in response to the summons signal, may not be able easily to determine which bank of ovens is ready to unload. It would therefore be advisable to include either the optional light (no. 19, FIG. 2) that is turned off when the oven or bank has completed its processing or the spring-loaded device (no. 35, FIG. 2) which pushes open the door(s) when a bank of ovens has completed processing. The former of those two options is included in the program described in FIG. 4.

Controls Setting Phase

Steps A, B (or B1, B2, B3 and B4) and C are as described above in association with FIG. 1 or FIG. 3, depending on the other options.

Automatic Phase

Step 1: This is the same as Step 1 described above in association with FIG. 1 or FIG. 3, respectively.

Step 1.5: This calculates the longest processing time for each bank of ovens. An array $K_{1...m}$ is set up to values of zero, with one element for each bank, in order of bank number. The oven processing times, array X, are scanned, once for each bank, on a counter d with a counter e controlling the scan of the ovens within the bank; in effect, working through the array b. The highest value of $X_{b(d,e)}$ [or $X_{b(d,e),1}$ if the option shown in FIG. 3 is used] within each bank, i.e. in the scan controlled by d, is stored in array K.

Step 1.6: This step calculates the inverse order in which the banks are to be completed, to be stored in an array $r_{1...m}$ to contain the bank numbers in that order. This is done by scanning the array K which contains the longest processing time for each bank. The elements of array r are first all zeros. Then, using s as a primary counter to establish the rank, the elements of K are scanned, using d as the secondary counter, and the highest element given the rank s. In effect, the current element in the array r is given the bank number of the larger value where that value is greater than the value of the bank number already in array r. When the first passage through the primary scan is completed, the first element of r, called $r_1$, will contain the number of the bank with the longest processing time. To prevent that bank being selected again, the value of its element in array K is temporarily multiplied by $-1$ so that its absolute value is preserved but it will come out low in subsequent comparisons. The second scan on s than produces the element number (bank number) with the second-longest processing time in array K and this bank number is stored in $r_2$; and so on. If there are equals within K, then the rank is according to bank number, as the method develops.

The values in the array K are then restored to their positive state.

Step 1.7: This processes the interval between cascading completions. First, the program establishes how many of the banks are actually in use, by scanning array K on memory location counter d and counting in memory location h only those elements that are not zero. Then, a check is made to ensure that the total of the cascading intervals plus the length of time for the bank with the shortest processing time is not greater than the longest processing time. This is done by testing to see if the value of I, the standard interval, multiplied by $(h-1)$, the number of banks in use other than the longest-running one which will be the first to start, is not greater than $K_{r(1)} - K_h$, i.e. the difference between the longest and the shortest processing time, for the bank with the shortest processing time will be pulled ahead by the cumulative intervals, and it must not thus be made to start before the bank with the longest time (otherwise the overall time would be lengthened). If, in the event, it is found that such a potential anomaly exists, the interval to be used, $I_z$, is made equal to an even division of the "slack," i.e. the difference between longest and shortest times divided by the number of banks in use other than the one with the longest time.

Step 1.8: An array P is established to contain, for each bank, the amount of time between its completion and the final completion. It if first set to zeros and the element in P for the bank with the longest processing time will remain at zero as its instant of completion will be the instant of final completion. Array P is filled by scanning, on a counter d, the array r which contains the bank numbers in descending order of length of processing time, the scan beginning with the second-longest. The counter value of d, less 1, at each passage through the scan, is multiplied by the value of the interval being used, $I_z$, and the product stored in the element of P according to the bank number in array r.

Step 1.9: All of the non-zero values in the array X are increased by the value from the array P, according to the bank number of the oven, obtained from array b.

Step 2: The starting-off of the countdown of S is as described above in association with FIGS. 1 or 3.

Step 3: This is exactly the same as the Step 3 described above in association with either FIG. 1 ora power ON (FIG. 1) or power setting code (FIG. 3), including nil power, signal is sent out, a signal to turn light 19 on, for the particular oven, or for the bank if the light is shared, is sent out by another port, wired appropriately, as is known in the art.

Step 3.4: The value $P_r(h)$, which is the termination of the earliest bank to finish, is combined with the value of W, the advance warning interval; if the sum is equal to T, the signal to summon the operator is sent out through the separate port wired to the visible and/or audible device. [The operator returns to the scene and, by the time he has arrived, the first bank of ovens will be ready to unload and their contents served.]

Step 3.5: The array P is scanned and, if any of its values is equal to T, the OFF signal is sent out to all of the ovens in the corresponding bank and to the corresponding light or lights 19.

Steps 4, 5, 6 and 7: These are the same as described above in association with FIG. 1 or FIG. 3, except that, in this example, the operator signal device is not actuated, having been processed in Step 3.4.

The process is complete.

Although several embodiments have been above described, this was for the purpose of describing, but not limiting, the invention. Various modifications, which will come readily to the mind of one skilled in the art, are within the scope of the invention as defined in the appended claims.

In particular, all features that are known in the art for use with a single microwave oven, as long as their automatic operation is ultimately dependent on *time* values, are within the scope of the invention as defined in the appended claims.

I claim:

1. An electronic system for processing a plurality of portions of food in a like plurality of microwave ovens, comprising:

means for accepting and storing the time values representing the processing time of respective portions in respective ovens;

clock means;

means for selecting the longest of the said time values;

means for counting down the time remaining in said longest time value, as clocked off by the said clock means;

means for comparing, at predetermined intervals, each said time value, one at a time, with the said time remaining, and for turning on a respective oven when its time value is equal to the time remaining;

means for turning off all the ovens when the said time remaining has reached zero.

2. A system as defined in claim 1 wherein said system is embodied in a microprocessor including a clock and input/output ports.

3. A process for electronically controlling the operation of a plurality of microwave ovens in which a like plurality of portions of food are being processed, comprising:

accepting and storing the processing times for the respective portions in the respective ovens;
selecting the longest of said processing times;
counting down time remaining, as measured by the clock, and comparing said time remaining to the processing times of the individual ovens;
turning on each respective oven when the said amount of time remaining is equal to the processing time;
turning off all the ovens in the plurality when the said time remaining has reached zero.

4. An electronic system for processing a plurality of portions of food in a like plurality of microwave ovens, comprising:
means for accepting and storing, in desired order of execution, a series of codes representing the consecutive power settings and the series of time values representing the processing time for each of the said series of power settings, for each of the respective portions in respective ovens;
clock means;
means for calculating and storing, for each of the said power settings, the sum of the said time value for that setting and the time values for all subsequent settings, for each of the ovens;
means for selecting the greatest of all said sums of time values;
means for counting down the time remaining in said greatest sum of time values, as clocked off by the said clock means;
means for comparing, at predetermined intervals, each said sum of time values, one at a time, with the said time remaining, and for turning the power to a respective oven to the setting represented by a power setting code when the respective sum of time values is equal to the time remaining;
means for turning off all the ovens when the said time remaining has reached zero.

5. A system as defined in claim 4 wherein said system is embodied in a microprocessor including a clock and input/output ports.

6. A process for electronically controlling the operation of a plurality of microwave ovens in which a like plurality of portions of food are being processed, comprising:
accepting and storing, in desired order of execution, a series of codes representing the consecutive power settings and their corresponding processing times, for the respective portions in the respective ovens;
calculating and storing, for each of the individual power settings, the sum of its processing time and the processing time of all the subsequent power settings for the same oven;
selecting the greatest of all the said sums;
counting down time remaining in the said greatest sum, as measured by the clock, and comparing said time remaining to the said sums of the processing times;
turning the power to an oven to the setting represented by one of its codes when the corresponding sum of processing times is equal to the time remaining;
turning off all the ovens in the plurality when the said time remaining has reached zero.

7. An electronic system as defined in claim 1, 2, 4, or 5, and further comprising:
means for storing a record of the subsets or banks into which the ovens have been allocated;
means for accepting and storing, until changed, the value of the desired interval of time between completions of processing of the portions of food in one bank of ovens and completion of processing of food in a next bank of ovens;
means for ranking the various banks in order of completion so that the total processing time remains the same yet there is an interval of time, as long as possible but no greater than the said desired interval, between completion of the processing for each bank and the completion of the processing for the next bank; the processing for all the ovens in the same bank to be completed at the same time;
means for calculating and storing, for each bank of ovens, other than the bank with the longest processing time, a value for the product of the standard interval times one less than the place of the bank in the order of processing;
means for adding the product, according to bank, to the time values, or to the sums of processing times, for all of the ovens in all the banks except the bank with the longest processing time, so that the comparisons with the time remaining use these increased time values or sums;
means for also comparing, at predetermined intervals, each said product with the time remaining, and for turning off all the ovens in a bank corresponding to that product.

8. A process, as defined in claim 3 or 6, and further comprising:
keeping a fixed record of the banks into which the ovens have been allocated;
accepting and storing the value of the desired interval of time between completions of the processing of portions of food in one bank of ovens and the completions or processing of those portions in the next bank;
selecting and storing for each bank the longest processing time, or greatest sum of processing times, for any oven in the bank;
ranking the banks in descending order of said longest times or greatest sums; and storing that ranking;
comparing the product of the said standard interval, multiplied by the number of banks in use less one, with the difference between the said longest time or greatest sum for the bank with the highest such longest time or greatest sum and the said longest time or greatest sum for the bank with the lowest such longest time or greatest sum; if finding that the said product is greater than the said difference, then, ensuring that no bank starts before the bank with the highest said longest time or greatest sum, recalculating the interval so that the said product, now recalculated, is no greater than the said difference;
calculating and storing, for each bank in use, the product of the said interval and the bank's place in the said ranking (except for the first ranked bank, i.e. the bank that has the highest said longest time value or greatest sum, in which case the said product is considered to be zero), said product being the time between the bank's completion and final completion (which is the completion of the bank with the said longest time value or greatest sum);
adding said product, according to bank, to every one of the time values or sums of processing times;
when counting down time remaining and comparing to time values or to sums of processing times, also comparing time remaining to the said products and turning off all the ovens in the respective bank when the two compared values are found equal.

9. An electronic system as defined in claim 1, 2, 4, or 5, and further comprising:

means for storing a record of the subsets or banks into which the ovens have been allocated;

means for accepting and storing, until changed, the value of the desired interval of time between completions of processing of the portions of food in one bank of ovens and completion of processing of food in a next bank of ovens;

means for ranking the various banks in the fixed sequence of the stored record of the banks where the allocation of ovens is recorded;

means for calculating and storing, for each bank of ovens, other than the last bank, a value for the product of the standard interval times the difference between the place of the bank in the order of processing and the place of the last bank in the said order;

means for adding the product, according to bank, to the time values, or to the sums of processing times, for all of the ovens in all the banks except the last bank, so that the selection of longest processing time and the comparisons with the time remaining use these increased time values or sums;

means for also comparing, at predetermined intervals, each said product with the time remaining, and for turning off all the ovens in a bank corresponding to that product.

10. A process, as defined in claim 3 or 6, and further comprising:

keeping a fixed record of the banks into which the ovens have been allocated;

accepting and storing the value of the desired interval of time between completions of the portions of food in one bank of ovens and the completions of those portions in the next bank;

ranking the banks in the fixed order in which they have been set up in the stored record of allocation of ovens;

calculating and storing, for each bank in use, other then the last bank, the product of the said interval times the difference between the bank's place in the said ranking and the place of the last bank in the said order, said product being the time between the bank's completion and final completion (which is the completion of the last bank);

adding said product, according to bank, to every one of the time values or sums of processing times except those for the ovens in the last bank;

when counting down time remaining and comparing to time values or to sums of processing times, also comparing time remaining to the said products and turning off all the ovens in the respective bank when the two compared values are found equal.

11. A system for processing as defined in claim 1, or 4, and further comprising:

means to set the correct time of day and to keep track of the correct time of day;

means to accept and store a time of day for completion of processing;

means to prepare the delayed start of the automatic phase of processing by subtracting the longest time value or greatest sum of processing time from the said stored time of day and to store that starting time of day;

means to generate the start of automatic processing by comparing the said starting time of day to the correct time of day, and starting when equality is found.

12. A process as defined in claim 3 or 6, and comprising the further steps of:

accepting and storing a correct time of day; calculating the correct time of day at predetermined intervals;

accepting a desired time of day for completion of processing; subtracting from that time of day the longest time value or the greatest sum of processing time to arrive at a starting time of day;

comparing, at predetermined intervals, the starting time of day with the correct time of day;

starting the automatic phase of the process when the comparison finds the two values equal.

13. An electronic system as defined in claim 1, 2, 4, or 5, and further comprising:

means for storing a record of the subsets or banks into which the ovens have been allocated;

means for accepting and storing, until changed, the value of the desired interval of time between completions of processing of the portions of food in one bank of ovens and completion of processing of food in a next bank of ovens;

means for ranking the various banks in order of completion so that the total processing time remains the same yet there is an interval of time, as long as possible but no greater than the said desired interval, between completion of the processing for each bank and the completion of the processing for the next bank; the processing for all the ovens in the same bank to be completed at the same time;

means for calculating and storing, for each bank of ovens, other than the bank with the longest processing time, a value for the product of the standard interval times one less than the place of the bank in the order of processing;

means for adding the product, according to bank, to the time values, or to the sums of processing times, for all of the ovens in all the banks except the bank with the longest processing time, so that the comparisons with the time remaining use these increased time values or sums;

means for also comparing, at predetermined intervals, each said product with the time remaining, and for turning off all the ovens in a bank corresponding to that product;

and further comprising:

means to set the correct time of day and to keep track of the correct time of day;

means to accept and store a time of day for completion of processing;

means to prepare the delayed start of the automatic phase of processing by subtracting the longest time value or greatest sum of processing time from the said stored time of day and to store that starting time of day;

means to generate the start of automatic processing by comparing the said starting time of day to the correct time of day, and starting when equality is found.

14. A process, as defined in claim 3 or 6, and further comprising:

keeping a fixed record of the banks into which the ovens have been allocated;

accepting and storing the value of the desired interval of time between completions of the portions of food in one bank of ovens and the completions of those portions in the next bank;

ranking the banks in the fixed order in which they have been set up in the stored record of allocation of ovens;

calculating and storing, for each bank in use, other than the last bank, the product of the said interval times the difference between the bank's place in the said ranking and the place of the last bank in the said order, said product being the time between the bank's completion and final completion (which is the completion of the last bank);

adding said product, according to bank, to every one of the time values or sums of processing times except those for the ovens in the last bank;

when counting down time remaining and comparing to time values or to sums of processing times, also comparing time remaining to the said products and turning off all the ovens in the respective bank when the two compared values are found equal;

and further comprising:

means to set the correct time of day and to keep track of the correct time of day;

means to accept and store a time of day for completion of processing;

means to prepare the delayed start of the automatic phase of processing by subtracting the longest time value or greatest sum of processing time from the said stored time of day and to store that starting time of day;

means to generate the start of automatic processing by comparing the said starting time of day to the correct time of day, and starting when equality is found.

* * * * *

UNITED STATES PATENT AND TRADEMARK OFFICE
CERTIFICATE OF CORRECTION

PATENT NO. : 4,390,965

DATED : June 28, 1983

INVENTOR(S) : Lionel Albert

It is certified that error appears in the above-identified patent and that said Letters Patent are hereby corrected as shown below:

Column 5, line 27, after "processing", "time" should be --times--.

Column 10, line 8, "Fig. 3" should be --Fig. 3A to 3C--.

Column 11, line 12, after "code", "by" should be --for--.

Column 14, line 9, after "Fig. 1", "ora" should be --or--.

Column 14, in between lines 9 & 10 the following should be inserted: --Figure 3 according to the options, except that whenever a--

Signed and Sealed this

Thirty-first Day of July 1984

[SEAL]

Attest:

Attesting Officer

GERALD J. MOSSINGHOFF

Commissioner of Patents and Trademarks